United States Patent

Obara et al.

[11] Patent Number: 4,988,130
[45] Date of Patent: Jan. 29, 1991

[54] METAL SEAL FLANGE ASSEMBLY

[75] Inventors: Kenjiro Obara; Kazuyuki Nakamura, both of Ibaraki; Yoshio Murakami, Mito; Masamitsu Naganuma, Yokohama; Kazunori Kitamura, Yokohama; Takao Uchida, Yokohama, all of Japan

[73] Assignees: Japan Atomic Energy Research Institute, Tokyo; Kabushiki Kaisha Toshiba, Kawasaki, both of Japan

[21] Appl. No.: 379,264

[22] Filed: Jul. 13, 1989

[30] Foreign Application Priority Data

Jul. 19, 1988 [JP] Japan .................. 63-178171

[51] Int. Cl.$^5$ ............................................. F16L 25/00
[52] U.S. Cl. .................................... 285/328; 285/363; 285/336; 285/422; 285/917; 285/901; 138/89
[58] Field of Search ............... 285/917, 901, 336, 422, 285/363, 328; 138/84

[56] References Cited

U.S. PATENT DOCUMENTS

| | | | |
|---|---|---|---|
| 3,208,758 | 9/1965 | Carlson et al. | 285/336 X |
| 3,217,922 | 11/1965 | Glasgow | 285/917 X |
| 3,301,576 | 1/1967 | Platt et al. | 265/422 X |
| 3,368,818 | 2/1968 | Asamaki et al. | 285/917 X |
| 3,747,963 | 7/1973 | Shivok | 285/336 |
| 3,989,285 | 11/1976 | Yancey . | |
| 4,616,860 | 10/1986 | Faria et al. | 285/917 X |

FOREIGN PATENT DOCUMENTS 0260356 3/1988 European Pat. Off. .
1009221 11/1965 United Kingdom .

OTHER PUBLICATIONS

Journal of Vacuum Science Technology, A1(2), Apr.-Jun. 1983 (P220), "Thermal Cycling and Torque Analysis of an Ultrahigh Vacuum Flange", A. O. Fuente.
Proc. 7th Intern. Vac. Congr. & 3rd Intern. Conf. Solid Surfaces (Vienna 1977) "The H Type Metal Gasket and its Application", G. Horikoshi.
Conflat Flanges, "The Industry Standard for High and Ultrahigh Vacuum Flange Performance", Varian Corporation.

Primary Examiner—Dave W. Arola
Attorney, Agent, or Firm—Oblon, Spivak, McClelland, Maier & Neustadt

[57] ABSTRACT

A pair of flanges are fixed to a pipe end of a port of a plasma vacuum vessel and another pipe end to be connected thereto. These flanges each have a ring-shaped knife edge. A copper gasket is interposed between the respective knife edges of the two flanges. A predetermined number of bolts are tightened to fix the flanges to each other. As a result, the knife edges bite into the copper gasket, and a linear sealing load from the knife edges acts on the gasket, thereby sealing and isolating the space inside the port from the outside. The number n of bolts are given by $$3(B+28)/65 - 0 \leq n \leq 3(B+28)/65 + 0.02B,$$

and the flange thickness t is given by $$\sqrt{1.7B} - 0.01B \leq t \leq \sqrt{1.7B} + 0.02B,$$

where B is the diameter of a circle passing through the respective central axes of the n number of bolts. Thus, the bolt number and the flange thickness are reduced without lowering the sealing performance.

5 Claims, 4 Drawing Sheets

METAL SEAL FLANGE ASSEMBLY

BACKGROUND OF THE INVENTION

1. Field of the Invention

The present invention relates to metal seal flange assemblies, and more particularly, to metal seal flange assemblies for connecting, for example, ports of a plasma vacuum vessel of a nuclear fusion apparatus and pipes which extend from various other apparatuses (e.g., vacuum pump, measuring instruments, etc.).

2. Description of the Related Art

In a nuclear fusion apparatus, nuclear fusion is caused in a state such that the inside of a plasma vacuum vessel is kept at ultra high vacuum and at high temperature. The vacuum vessel is provided with a number of ports of various types These ports are connected with pipes which extend from various apparatuses (e.g., vacuum pump, measuring instruments, etc.). In some cases, a blank cover and a transparent plate for the observation of the interior of the vessel may be attached to any of the ports In connecting the ports and the pipes from the various apparatuses, the inside of the ports must be sealed and isolated from the outside so that it is kept in an ultrahigh vacuum free from impurities. Satisfactory sealing performance must be maintained even though the inside of the ports is at high temperature. Accordingly, metal seal flange assemblies each having a metal gasket are used to connect the ports and the various apparatuses.

Each flange assembly has a pair of flanges fixed to a port and an end of a pipe. A pair of ring-shaped knife edges are formed individually on the respective opposite surfaces of the two flanges. A ring-shaped copper gasket is interposed between the two knife edges. When a plurality of bolts, penetrating the flanges and arranged in a ring, are tightened, the flanges are fixed to each other. Thereupon, the knife edges bite into the copper gasket, and a linear sealing load from the extremities of the ring-shaped knife edges bears on the ring-shaped gasket. The linear sealing load, which acts on the whole circumference of the gasket, is defined by a value obtained by dividing the load from the knife edges acting on the copper gasket by the circumference of the extremity of each knife edge. Thus, the inside of the ports are sealed and isolated from the outside so that it is kept in an ultrahigh vacuum free from impurities.

The sealing performance depends on the size and distribution of the linear sealing load In order to obtain satisfactory sealing performance, therefore, the sealing load must have a predetermined value, and the distribution of the sealing load must be uniform with respect to the circumferential direction. The size and distribution of the linear sealing load depend on the rigidity of the flanges (i.e., thickness and material of the flanges), the number of bolts, the bolt tightening torque, and the material of the gasket.

Conventionally, there are recommendation standards for the flange thickness, bolt number, etc. (JVIS-003 entitled "Shape & Dimensions of Bakable Flanges for Vacuum Apparatuses," established on Dec. 1, 1982, by the Japan Vacuum Association), which are used to maintain satisfactory sealing performance. Table 1 shows these standards.

TABLE 1

| Nominal Diameter | Outside Diameter of Flange (mm) | Flange Thickness t (mm) | Bolt Diameter by Number | Bolt Pitch Circle Diameter B (mm) | Knife Edge Circle Diameter De (mm) | Linear Sealing Load $W_{S1}$ (N/mm) | Linear Sealing Load $W_{S2}$ (N/mm) |
|---|---|---|---|---|---|---|---|
| 40 | 70 | 13 | M6 × 6 | 58.7 | 42.0 | 146 | 204 |
| 63 | 114 | 18 | M8 × 8 | 92.1 | 77.2 | 224 | 267 |
| 100 | 152 | 21 | M8 × 16 | 130.2 | 115.3 | 318 | 359 |
| 160 | 203 | 22 | M8 × 20 | 181.0 | 166.1 | 286 | 312 |
| 200 | 253 | 25 | M8 × 24 | 231.8 | 216.9 | 268 | 286 |

In Table 1, linear sealing load $W_{S1}$ is given by $$W_{S1} = \sigma \cdot n \cdot S / \pi B \quad (N/mm). \tag{1}$$

Also, linear sealing load $W_{S2}$, which is not provided by JVIS-003, is given by $$W_{S2} = \sigma \cdot n \cdot S / \pi \cdot De \quad (N/mm). \tag{2}$$

Here $\sigma$ is bolt tensile stress (MPa); n, bolt number; S, effective cross-sectional area (mm$^2$) of bolts; B, bolt pitch circle diameter (mm); and De, knife edge circle diameter (mm).

The values of the linear sealing load in Table 1 are obtained with $\sigma = 200$ MPa.

However, if the flange thickness, bolt number, etc. are set to their respective predetermined values in accordance with the recommendation standards, the following awkward situations sometimes may be entailed, although the satisfactory sealing performance can naturally be maintained.

A great number of ports of the plasma vacuum vessel are connected individually with the various apparatuses, so that the intervals between the ports are very short. Therefore, the spaces for the assembling and disassembling work for the flange assemblies are very narrow, so that the work is highly troublesome.

According to the aforementioned recommendation standards, moreover, the bolt number and the flange thickness are set to relatively great values. Thus, the assembling and disassembling work for the flange assemblies is highly troublesome, and the flanges are not very handy to carry.

According to the conventional standards, furthermore, the bolt tightening torque is so great that the maximum permissible tensile stress of the bolts is exceeded As a result, the bolts are subjected to plastic deformation, and in the worst case, may be damaged.

After the flanges are assembled with the ports, the vacuum vessel and the flange assemblies are baked (more specifically, heated and degassed) in order that impurities are removed from the vessel to form an ultrahigh vacuum therein At the same time, the flanges and the gaskets sometimes may be expanded and subjected to plastic deformation. If the vacuum vessel is cooled thereafter, the flanges and the gaskets are contracted in the deformed state. As a result, gaps are formed between the extremities of the knife edges and the gaskets, and air penetrates through the gaps into the vacuum vessel. In other words, a leakage is caused.

According to the conventional recommendation standards, as described above, the maximum permissible tensile stress of the bolts sometimes may be exceeded so that the bolts are subjected to plastic deformation. When the vacuum vessel is cooled after baking, in such a case, gaps are very likely to be formed between the knife edges and the gaskets In consequence, there is a fair chance for a leakage Thus, although the conventional recommendation standards ensure the satisfactory sealing performance, they are subject to the various drawbacks.

SUMMARY OF THE INVENTION

A first object of the present invention is to provide a metal seal flange assembly, in which the number of bolts and the flange thickness are reduced without changing the sealing performance, so that the troublesomeness of assembling and disassembling work and transportation can be eased.

A second object of the present invention is to provide a metal seal flange assembly, in which the bolt tightening torque is reduced without changing the sealing performance, so that the possibility of bolts being damaged is lowered.

A third object of the present invention is to provide a metal seal flange assembly in which the bolt tightening torque is reduced without changing the sealing performance, so that the sealing performance is restrained from being lowered after a vacuum vessel is baked.

According to the present invention, there is provided a metal seal flange assembly, which comprises a pair of steel plates individually having a pair of opposite surfaces facing each other, at least one of the plates having a hole defining a space to be sealed, the plates individually having a pair of ring-shaped knife edges formed on the opposite surfaces outside the hole, with respect to the radial direction thereof, so as to face each other, the knife edges having an edge angle of 70° to 100°; a ring-shaped copper gasket interposed between the pair of knife edges; and a plurality of bolts penetrating the pair of opposite surfaces and arranged along a ring-shaped line, the bolts being adapted to fix the pair of plates to each other when tightened, so that the pair of knife edges bite into the copper gasket, and a linear sealing load from the knife edges bears on the gasket, thereby sealing and isolating the space inside the hole from the outside, wherein the number n of bolts are given by $$3(B+28)/65 - 0 < n < 3(B+28)/65 + 0.02B,$$
and the thickness t of each plate is given by $$\sqrt{1.7B} - 0.01B \leq t \leq \sqrt{1.7B} + 0.02B,$$

where B is the diameter of a circle passing through the respective central axes of the n number of bolts.

Tests and analysis made by the inventors hereof (which will be described later in connection with the embodiments) indicate that the sealing performance can be maintained when bolt number n and plate (flange) thickness t are set within the above ranges. Thus, the bolt number and the flange thickness are reduced as compared with the conventional standards, so that the troublesomeness of assembling and disassembling work and transportation can be eased.

According to the aforesaid tests and analysis, moreover, it was ascertained that the normal sealing performance can be maintained even if the bolt tightening torque is smaller than in the conventional case. Thus, the possibility of the bolts being damaged can be lowered.

Since the bolt tightening torque is set to a small value, furthermore, the sealing performance can be restrained from being lowered after the vacuum vessel is baked.

DETAILED DESCRIPTION OF THE PREFERRED EMBODIMENTS

Figure 1:
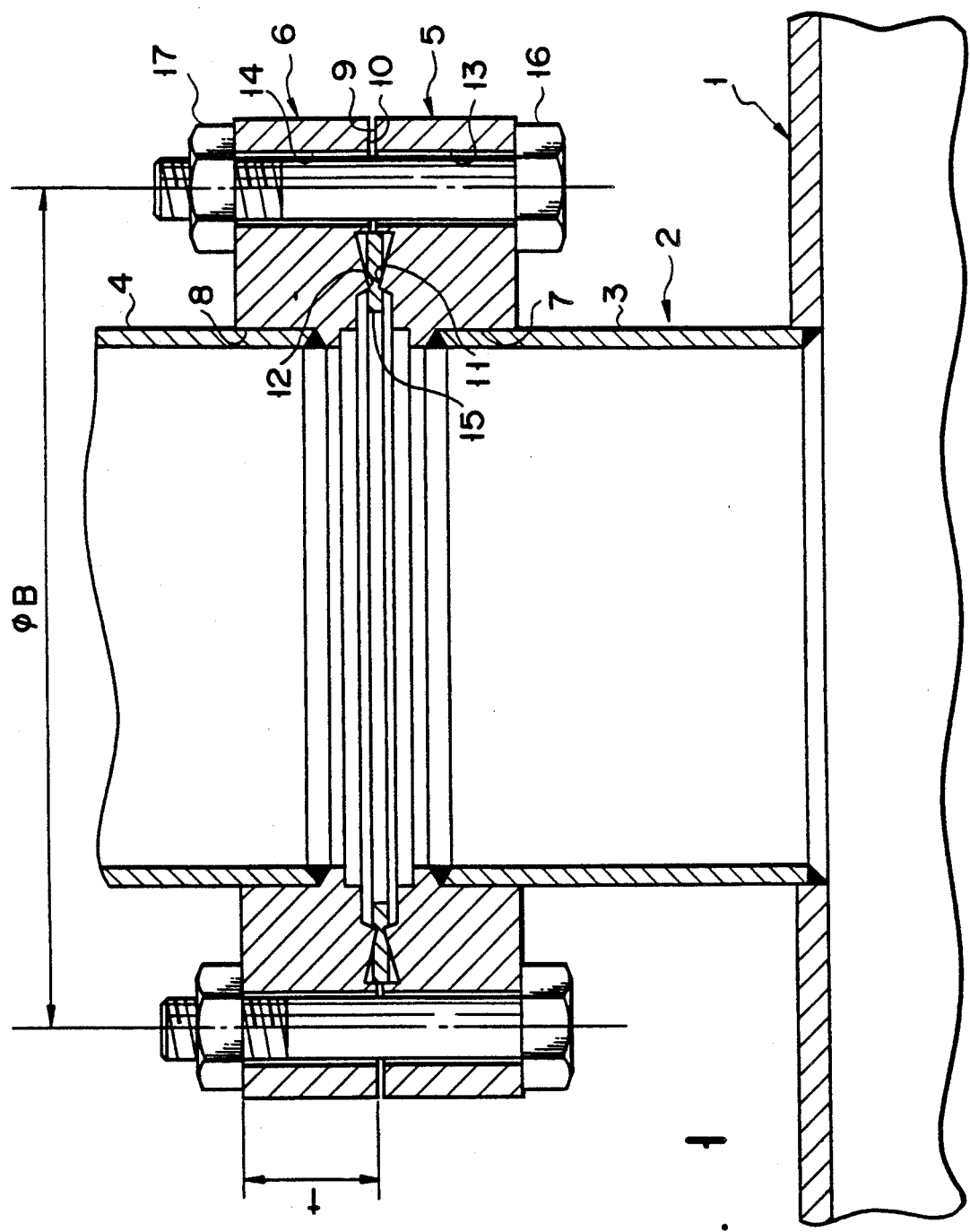
FIG. 1 is a sectional view showing a plasma vacuum vessel and a metal seal flange assembly attached to a port of the vessel.

In an embodiment shown in FIG. 1, plasma vacuum vessel 1 is provided with port 2 which includes pipe 3. Pipe 3 is connected with pipe 4 which extends from, e.g., a vacuum pump or a measuring instrument (not shown).

A pair of ring-shaped flanges or plates 5 and 6 are fixed to facing end portions of pipes 3 and 4, respectively. More specifically, pipes 3 and 4 are welded to walls 7 and 8 of holes formed in flanges 5 and 6, respectively. Flanges 5 and 6 have opposite surfaces 9 and 10, respectively, facing each other. A pair of ring-shaped knife edges 11 and 12 defining an angle $\alpha$ are formed on surfaces 9 and 10, respectively. Further, a predetermined number of fitting holes 13 and 14 which may be evenly spaced around the flanges are formed at predetermined circumferential intervals in flanges 5 and 6, respectively.

Ring-shaped copper gasket 15 is interposed between knife edges 11 and 12. A predetermined number of bolts 16 are inserted in their corresponding fitting holes 13 and 14, and are threadedly engaged with their corresponding nuts 17.

Flanges 5 and 6 are formed of austenitic stainless steel, and the edge angle $\alpha$ of knife edges 11 and 12 ranges from 70° to 100°.

When bolts 16 are tightened, flanges 5 and 6 are fixed to each other. Thereupon, ring-shaped knife edges 11 and 12 bite into copper gasket 15, thereby applying linear sealing load to the ring shaped gasket. Thus, the inside of port 2 is sealed and isolated from the outside so that it is kept in an ultrahigh vacuum free from impurities.

Figure 2:
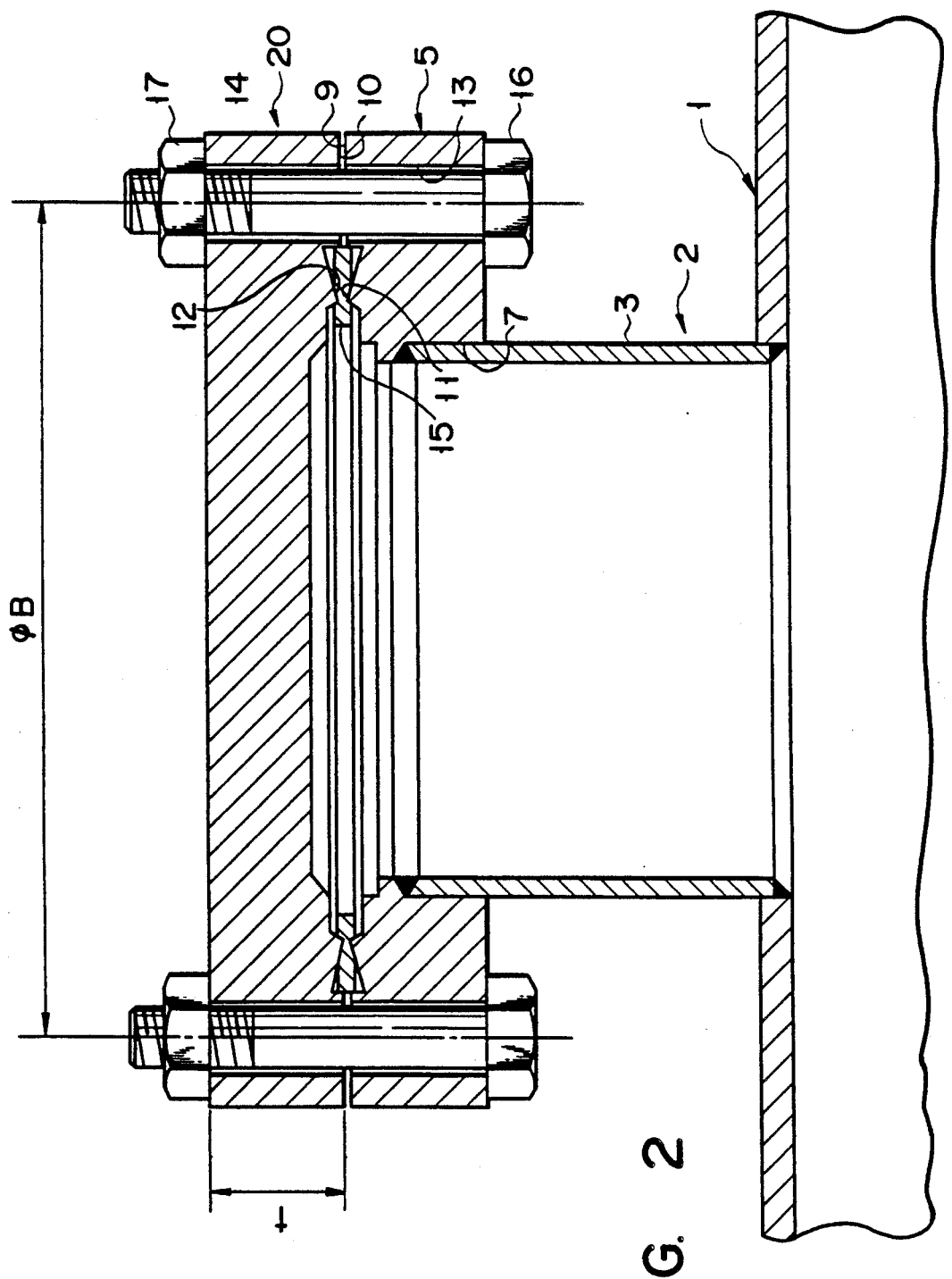
FIG. 2 is a sectional view showing the plasma vacuum vessel and the metal seal flange assembly, in which the port is fitted with a blank cap.

In an embodiment shown in FIG. 2, blank cap 20, instead of flange 6, is attached to flange 5 on the port side. Cap 20 naturally has opposite surface 10, which is formed with knife edge 12 and fitting hole 14. Thus, when bolts 16 are tightened, cap 20 and flange 6 are fixed to each other, so that the inside space of port 2 is sealed and isolated from the outside It is to be understood that blank cap 20 is formed of austenitic stainless steel.

According to the present invention, bolt number n and flange thickness t are set within the following ranges.

$$3(B+28)/65 - 0 \leq n \leq 3(B+28)/65 + 0.02B, \quad (3)$$

$$\sqrt{1.7B} - 0.01B \leq t \leq \sqrt{1.7B} + 0.02B. \quad (4)$$

Here B is the diameter (mm) of a circle passing through the respective central axes of n number of bolts 16. This diameter will hereinafter be referred to as bolt pitch circle diameter B.

The above ranges of bolt number n and flange thickness t were obtained by the following tests and analysis made by the inventors hereof The inventors made tests and numerical analysis on the sealing performance of a number of metal seal flanges of the knife-edge type whose caliber ranges from 40 to 200 mm, as provided by JVIS-003. In these tests, the acceptability of the sealing performance was examined using the bolt number, tightening torque, and flange thickness as parameters. The results of these tests were subjected to numerical analysis to determine the ranges given by expressions (3) and (4).

The following is a description of test results and analysis on a flange, as an example, whose outside diameter is 152 mm (100-mm caliber).

Figure 3:
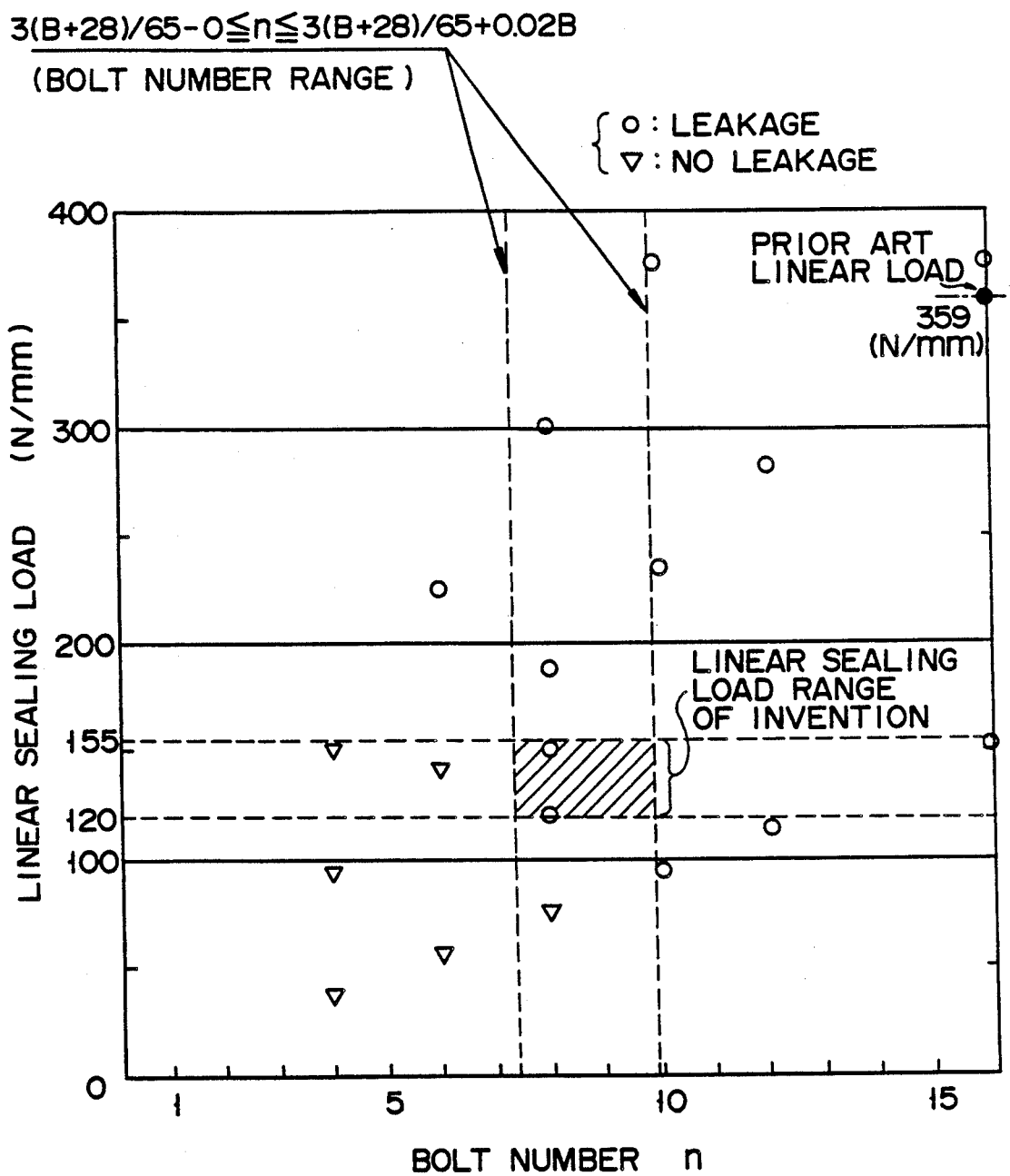
FIG. 3 is a graph showing the relationship between the bolt number and the linear sealing load.
Figure 4:
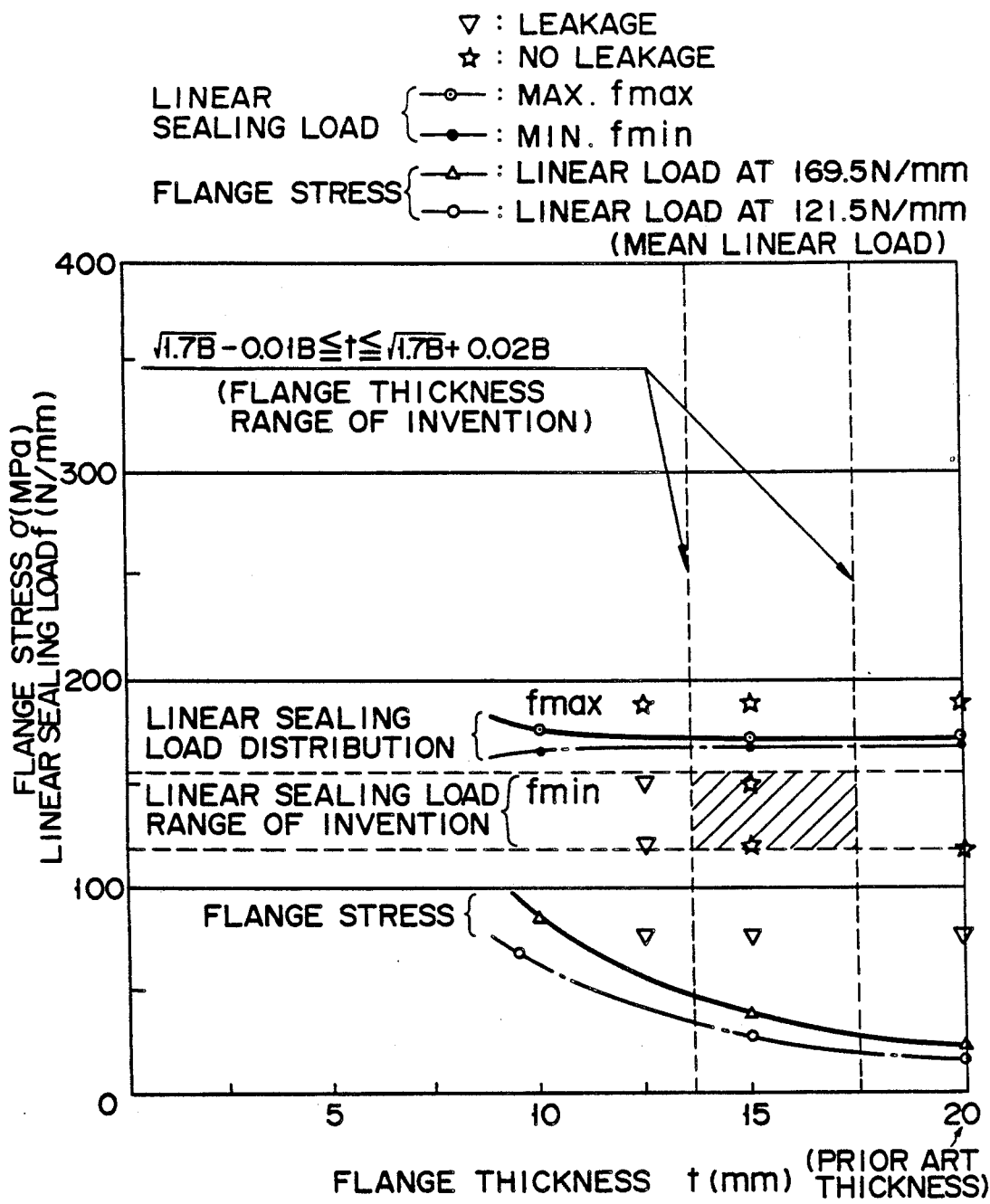
FIG. 4 is a graph showing the relationships between the flange thickness and the linear sealing load and between the flange thickness and the flange stress.

The test results obtained include the relationship between the bolt number and linear sealing load, as shown in FIG. 3, and the relationships between the flange thickness and flange stress and between the flange thickness and linear sealing load, as shown in FIG. 4. Specific numerical values are shown in Table 2. FIG. 4 shows results obtained when the bolt number is 8.

sealing performance, and the distribution of the sealing load is uniform with respect to the circumferential direction.

Accordingly, the satisfactory sealing performance can be ensured by using at least 8 bolts In other words, it is unnecessary to use so many bolts. Thus, the bolt number suitably ranges from 8 to 10. In consideration of the relationship between bolt number n and bolt pitch circle diameter B, the suitable bolt number range is given by expression (3).

Further, the linear sealing load must be set to 155 N/mm or less. This is because the tensile stress of the bolts may possibly exceed the maximum permissible limit when the sealing load is more than 155 N/mm. Accordingly, the suitable range of the linear sealing load is 120 to 155 N/mm. Thus, the hatched region of FIG. 3 represents the range within which a suitable number of bolts are used without a leakage.

If the outside diameter of the flange is 152 mm (100-mm caliber), the bolt number and the linear sealing lead based on the conventional recommendation standards are 16 and 359 N/mm, respectively. As seen from the above description, these conventional values are too great. In the present invention, therefore the bolt number is reduced without failing to maintain the satisfactory sealing performance. In this manner, the troublesomeness of the assembling and disassembling work for the flange assembly can be eased.

If the linear sealing load is 359 N/mm, the tensile stress of the bolts is conventionally set to a value in excess of the maximum permissible limit, so that the bolts are subjected to plastic deformation. When the vacuum vessel is cooled after baking, therefore, the force of the bolts to fasten the flanges is insufficient, so

TABLE 2

| Case | Bolt Number n | Flange Thickness t (mm) | Linear Sealing Load (N/mm) | | | Flange Stress (MPa) | Bolt Shank Force (N) | Leak Test Result |
|---|---|---|---|---|---|---|---|---|
| | | | f max | f min | f mean | | | |
| 1 | 16 | 20 | 175.9 | 175.8 | 175.8 | 14.1 | 3067 | No Leakage |
| 2 | 8 | 20 | 67.9 | 67.5 | 67.8 | 8.5 | 3067 | Leakage |
| 3 | 8 | 20 | 122.4 | 121.4 | 121.5 | 15.4 | 5517 | — |
| 4 | 8 | 20 | 170.0 | 168.8 | 169.5 | 22.5 | 7653 | No Leakage |
| 5 | 8 | 15 | 123.0 | 120.9 | 121.5 | 27.2 | 5517 | — |
| 6 | 8 | 9.5 | 126.3 | 118.6 | 121.5 | 67.3 | 5517 | — |
| 7 | 8 | 15 | 136.8 | 134.5 | 135.2 | 30.3 | 6125 | No Leakage |
| 8 | 4 | 20 | 145.4 | 128.5 | 135.2 | 32.8 | 12250 | Leakage |

The following circumstances can be understood from the test results of FIG. 3. If the bolt number and the linear sealing load are 7 or less and 120 N/mm or less, respectively, the sealing performance is not high enough to prevent a leakage Supposedly, this is because the value of the sealing load is not great enough to secure satisfactory sealing performance. If the bolt number and the linear sealing load are 7 or less and 120 N/mm or more, respectively, there is also a leakage. Presumably, this is because the distribution of the sealing load is uneven with respect to the circumferential direction, although the load value is great enough to secure the satisfactory sealing performance. If the bolt number and the linear sealing load are 8 or more and 120 N/mm or less, respectively, there is also a leakage. Presumably, this is because the value of the sealing load is not great enough.

If the bolt number and the linear sealing load are 8 or more and 120 N/mm or more, respectively, on the other hand, the sealing performance is high enough to prevent a leakage. Supposedly, this is because the value of the sealing load is great enough to secure the satisfactory that a gap may be formed with high possibility between the knife edges and the gasket.

According to the present invention, on the other hand, the linear sealing load is set to a relatively low value, so that the tensile stress of the bolts is within the maximum permissible limit. When the vacuum vessel is baked (at a temperature of 300 to 350° C.) and cooled, therefore, the bolts can be subjected to elastic deformation. Thus, a gap is not likely to be formed between the knife edges and the gasket, so that there is only a slender chance for a leakage.

Since the tensile stress of the bolts is within the maximum permissible limit, moreover, the possibility of the bolts being damaged is much lower than in the conventional case.

The following circumstances can be understood from the test results of FIG. 4. If the flange thickness is less than 13.5 mm, the distribution of the linear sealing load is extremely uneven with respect to the circumferential direction. If the flange thickness is about 13.5 mm or more, on the other hand, the distribution of the sealing load is substantially uniform, and it makes no change despite the increase of the flange thickness. If the flange thickness is less than 13.5 mm, moreover, the stress on the flanges increases drastically as the flange thickness decreases. If the flange thickness exceeds about 17.5 mm, on the other hand, the stress on the flanges does not lower very much with the increase of the flange thickness. As seen from these circumstances, the suitable range of flange thickness t is about 13.5 mm $<t<$ about 17.5 mm. Thus, in consideration of the relationship between bolt pitch circle diameter B and bolt number n, the suitable flange thickness range is given by expression (4).

Moreover, the test results of FIG. 3 indicate that the suitable range of the linear sealing load is 120 to 155 N/mm. Thus, the hatched region of FIG. 4 represents the range within which flanges of a suitable thickness are used without a leakage If the outside diameter of the flange is 152 mm (100-mm caliber), the flange thickness conventionally is 20 mm. As seen from the above description, this conventional value is too great. In the present invention, therefore, the flange thickness is reduced without failing to maintain the satisfactory sealing performance. Accordingly, the flanges are handier to carry.

According to the present invention, as described herein, the bolt number and the flange thickness are reduced, as compared with the conventional standards, without changing the sealing performance, so that the troublesomeness of the assembling and disassembling work and transportation can be eased. Moreover, the bolt tightening torque is made smaller than in the conventional case, without changing the sealing performance, so that the possibility of the bolts being damaged can be lowered. Since the bolt tightening torque is set to a small value, furthermore, the bolts can undergo elastic deformation when the vacuum vessel is baked, so that the sealing performance can be restrained from being lowered.

What is claimed is:

1. A metal seal flange assembly comprising:
   a pair of steel plates individually having a pair of opposite surfaces facing each other, at least one of said plates having a hole defining a space to be sealed, said plates individually having a pair of ring-shaped knife edges formed on the opposite surfaces outside the hole, with respect to the radial direction thereof, so as to face each other, said knife edges defining an included edge angle of 70° to 100° ;
   a ring-shaped copper gasket interposed between the pair of knife edges; and
   a plurality of bolts penetrating the pair of opposite surfaces and arranged along a ring-shaped line, said bolts being adapted to fix the pair of plates to each other when tightened, so that the pair of knife edges bite into the copper gasket, and a linear sealing load from the knife edges bears on the gasket, thereby sealing and isolating the space inside the hole from the outside, wherein the number n of bolts are given by $$3(B+28)/65 - 0 \leq n < 3(B+28)/65 + 0.02B,$$

and the thickness t of each said plate is given by $$\sqrt{1.7B} - 0.01B \leq t \leq \sqrt{1.7B} + 0.02B,$$

where B is the diameter of a circle passing through the respective central axes of the n number of bolts.

2. The metal seal flange assembly according to claim 1, wherein each said plate is formed of austenitic stainless steel.

3. The metal seal flange assembly according to claim 1, wherein the material of said copper gasket contains silver.

4. The metal seal flange assembly according to claim 1, wherein said space in the hole of the plate communicates with a vacuum vessel.

5. The metal seal flange assembly according to claim 1, wherein one of said plates is a blank cap.

* * * * *

UNITED STATES PATENT AND TRADEMARK OFFICE
CERTIFICATE OF CORRECTION

PATENT NO. : 4,988,130
DATED      : January 29, 1991
INVENTOR(S) : Kenjiro Obara, et al It is certified that error appears in the above-identified patent and that said Letters Patent is hereby corrected as shown below:

In the drawings

In the upper right hand corner of Figure 3, the legend following the symbol "O" should be --NO LEAKAGE-- rather than "LEAKAGE", and the legend following the symbol "∇" should be --LEAKAGE-- rather than --NO LEAKAGE--.

Signed and Sealed this

Twenty-second Day of September, 1992

Attest:

DOUGLAS B. COMER

*Attesting Officer*        *Acting Commissioner of Patents and Trademarks*